April 29, 1952  T. A. RICH  2,594,994
GROUND DETECTOR CIRCUIT
Filed Oct. 31, 1950  2 SHEETS—SHEET 1
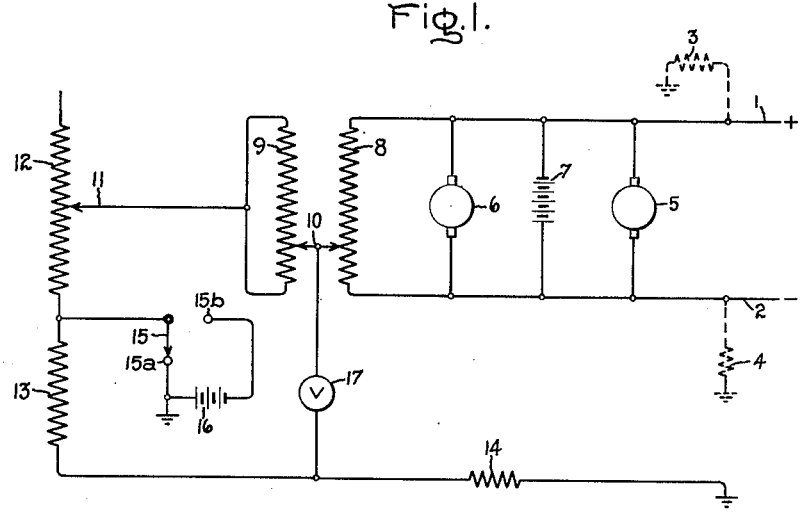
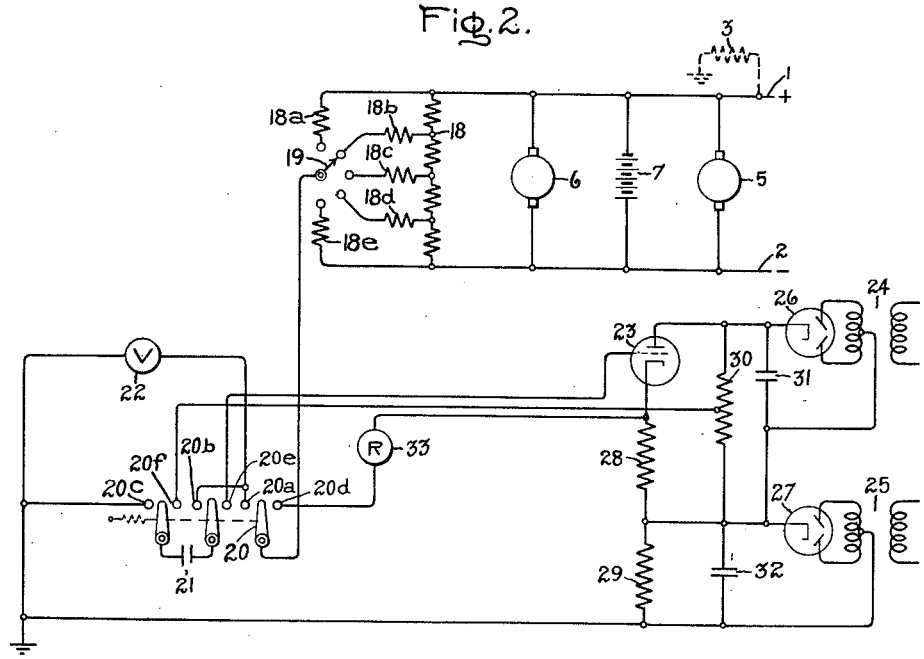
Inventor:
Theodore A. Rich,
by Paul A. Frank
His Attorney.

April 29, 1952     T. A. RICH     2,594,994
GROUND DETECTOR CIRCUIT
Filed Oct. 31, 1950     2 SHEETS—SHEET 2
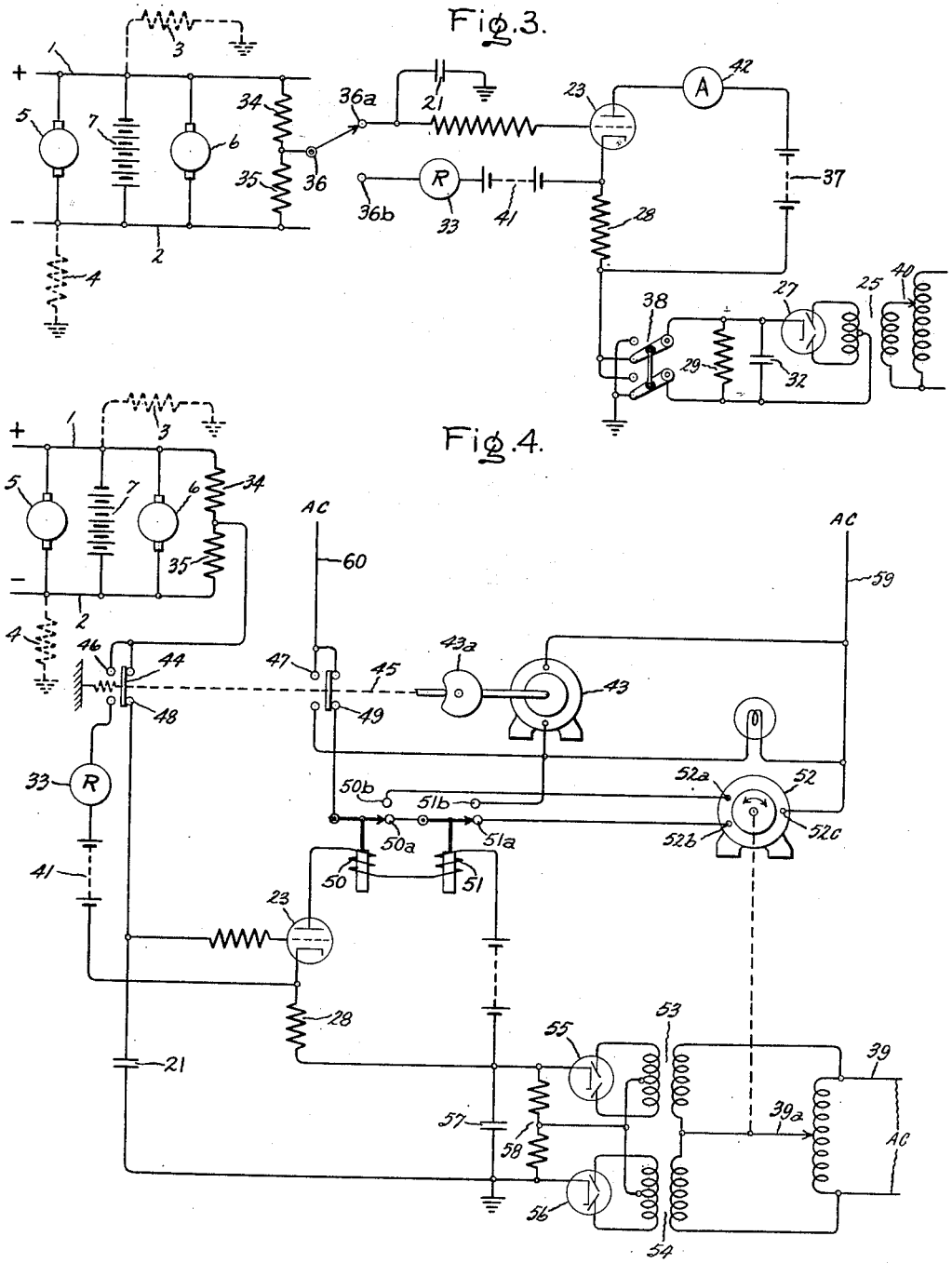
Inventor:
Theodore A. Rich,
by Paul A. Frank
His Attorney.

Patented Apr. 29, 1952

2,594,994

UNITED STATES PATENT OFFICE 2,594,994

GROUND DETECTOR CIRCUIT

Theodore A. Rich, Schenectady, N. Y., assignor to General Electric Company, a corporation of New York Application October 31, 1950, Serial No. 193,226

5 Claims. (Cl. 175—183)

My invention relates to ground detector circuits and more particularly to circuits for detecting the presence of grounds on energized transmission lines.

On naval vessels employing direct current transmission lines, it is advisable to be able to detect the presence of undesired grounds on the transmission lines before any grounded condition becomes serious. Whenever it is suspected that the transmission line is grounded, it has been necessary to deenergize the line to determine whether there actually is a ground on the line. If a naval vessel is engaged in a combat mission, it is extremely unfortunate when a transmission line is deenergized to check for grounds. All electrically driven equipment must be stopped. If both sides of a transmission line should become grounded, there would be a short circuit on the power supply, and the resulting high currents might cause extensive damage to expensive equipment and to personnel.

Therefore, an important object of my invention is to provide means for detecting the presence of a ground on a direct current transmission line while the transmission line is energized.

Another object of my invention is to provide effective, low-cost means for detecting the presence of a ground on a direct current transmission line while the transmission line is energized and which means may be conveniently operated by unskilled personnel.

In carrying out my invention in one embodiment thereof, a voltage divider is connected across an energized direct current transmission line. A cathode-follower circuit and a capacitive "remembering" circuit cooperate to compensate the potential impressed on the voltage divider by the transmission line and to measure the resistance to ground through the voltage divider.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which each of the four figures is a schematic diagram of a different ground detector circuit embodying my invention.

Referring to the drawings, the ground detector circuit illustrated in Fig. 1 employs a resistance bridge arrangement for determining the magnitude of the leakage resistance between the transmission lines and ground. The resistors 13 and 14 are the ratio arms of the resistance bridge arrangement. Resistors 3 and 4 and potentiometer 8 comprise the unknown arm of the bridge. Potentiometers 9 and 12 comprise the balancing arm of the bridge. A battery 16 of known voltage is applied to the circuit to enable the resistance to ground to be measured.

The direct current supply conductors 1 and 2 represent a direct current transmission line and have connected between them the generator 6, the battery 7, and various loads, such as the motor 5. The resistors 3 and 4 represent the leakage resistance to ground from conductors 1 and 2, respectively. Resistors 3 and 4 are not physical circuit elements, but their effect is present nevertheless. Generator 6, battery 7, and motor 5 have small internal impedance compared with the potentiometer 8. The potentiometers 8 and 9 are arranged with a common slider arm 10. Potentiometers 8 and 9 are assigned values of resistance having the same ratio to one another as do the ratio resistors 14 and 13, respectively, so that it is not necessary to rebalance the bridge after slider 10 is moved.

When the transmission line is in its normal operating condition, that is, with high leakage resistance, the resistance of the unknown arm of the bridge must be determined to serve as a reference level for satisfactory operation. This is done by balancing the bridge as hereinafter explained.

The effect on the bridge circuit of the potential impressed on potentiometer 8 by generator 6 and battery 7 is neutralized by adjusting slider 10 to a position on potentiometer 8 corresponding to ground potential. This is done when switch 15 is in contact with terminal 15a. The correct position for slider 10 is indicated by a null reading on the voltmeter 17.

Switch 15 is now turned to contact terminal 15b thereby connecting the battery 16 between the resistance bridge and ground. Potentiometer 12 is adjusted to obtain a null reading on voltmeter 17. The setting on calibrated potentiometer 12 gives an indication of the total resistance of the unknown arm of the bridge under normal operating conditions.

If it is suspected that the transmission line is grounded, slider 10 is adjusted to ground potential as hereinbefore described. Next switch 15 is operated to connect the battery 16 between the bridge and ground, and potentiometer 12 is adjusted to balance the bridge. If the resistance indicated by the new setting of potentiometer 12 is substantially less than the resistance measured under normal operating conditions, at least one side of the transmission line is grounded. The position of slider 10 with respect to the conductors 1 and 2 gives a direct indication to the operator which conductor is grounded, for a null is obtained when slider 10 is adjacent the grounded conductor.

For some applications of the detector illustrated in Fig. 1, potentiometer 8 must be constructed to withstand voltages of the order of 1000 volts. Potentiometer 9 must be carefully adjusted to obtain a null on voltmeter 17 before battery 16 is switched into the circuit. Each of the following embodiments eliminates the need for potentiometers capable of withstanding voltages of this magnitude and for precise adjustments.

The embodiments of my invention illustrated in Figs. 2, 3 and 4 all involve a direct current transmission line and loading on the transmission line similar to that shown in Fig. 1. Wherever corresponding elements are employed in more than one embodiment, the same designating numerals are used throughout.

Each of the following embodiments of my invention used an ammeter calibrated to indicate the leakage resistance directly. In each case, it is necessary to obtain the leakage resistance for normal operation to serve as a reference for determining the severity of subsequent grounded conditions.

The embodiment illustrated in Fig. 2 replaces the potentiometers 8 and 9 in Fig. 1 with a voltage divider 18 and a selector switch 19. The magnitudes of the series resistors 18a, 18b, 18c, 18d and 18e are chosen so that the resistance between each of the contacts of switch 19 and the terminals of generator 6 is constant.

In the circuit illustrated in Fig. 2, there is a terminal on switch 19 having a potential with respect to ground within a predetermined range, such as 100 volts. When the triple-pole-double-throw switch 20 is in the position to the left, a capacitive, or "remembering," circuit, such as the capacitor 21, is connected between the voltage divider circuit and ground. The operator simply manipulates switch 19 to the terminal having 100 volts or less potential between the contact and ground. When one conductor of the transmission line is grounded, switch 19 must be moved to a terminal adjacent the grounded conductor to obtain a voltage of 100 volts or less. The voltmeter 22 indicates the voltage between switch 19 and ground, and capacitor 21 is charged to this voltage.

The amplifier 23 is loaded in its cathode circuit. This arrangement is well known in the art as a cathode-follower circuit. The salient feature of the cathode-follower circuit is that it can have substantially unity gain.

A source of direct potential, such as that supplied by the two power packs shown in Fig. 2, supplies the potentials required for the operation of the ground detector circuit. The output of rectifier 27 is of some value such as 400 volts above ground potential. Bleeder resistor 29 is connected between the output of rectifier 27 and ground potential. The resistor 28 is connected between the cathode of amplifier 23 and the output lead of rectifier 27. The output of rectifier 26 is of some value such as 300 volts and is serially connected with the output of rectifier 27 so that the output lead of rectifier 26 is approximately 700 volts above ground potential. The bleeder resistor 30 is connected between the cathodes of rectifiers 26 and 27. The cathode of rectifier 26 is connected to the plate of amplifier 23.

Terminal 20f of switch 20 is connected to resistor 30 at a point corresponding to some voltage, such as 500 volts, above ground potential. The condensers 31 and 32 connected across the outputs of rectifiers 26 and 27 are merely filter condensers. The control electrode of amplifier 23 is connected to terminal 20e. An ammeter 33 having its scale calibrated in ohms is connected between terminal 20d and the cathode of amplifier 23.

When capacitor 21 is charged to the voltage between switch 19 and ground, switch 20 is thrown to its right-hand position thereby connecting switch 19 to terminal 20d and connecting capacitor 21 between terminals 20e and 20f. The voltage on the control electrode of amplifier 23 now is equal to 500 volts plus the voltage on switch 19 as "remembered" by capacitor 21. The rapid increase in the grid voltage of amplifier 23 causes a sharp increase in the tube current. The increasing current raises the potential drop in resistors 28 and 29 thereby raising the potential of the cathode with respect to ground to the potential of the grid. The cathode potential stabilizes at this value. When the voltage of the cathode is equal to 500 volts plus the "remembered" voltage of switch 19 and is connected through ammeter 33 in opposition with the actual voltage on switch 19, a net voltage of 500 volts is impressed between ground and switch 19.

Ammeter 33 measures the current produced by the 500 volts through switch 19, resistor 18b, the two paths to conductors 1 and 2 provided by voltage divider 18, and through any leakage resistance to ground. The resistance from switch 19 to the terminals of generator 6 is constant, and the total circuit resistance is equal to this constant plus the leakage resistance since the internal resistance of generator 6, battery 7, and motor 5 is small compared to voltage divider 18. By proper calibration, the ammeter can be made to read the leakage resistance directly. This resistance is then compared with the known leakage resistance for normal operation. The major advantage of the circuit of Fig. 2 is that the operator need make no precise adjustments.

In Fig. 2, a point on voltage divider 18 was selected which was at a potential close to ground potential compared to the transmission line conductors. In Fig. 3 is shown an arrangement which produces a local voltage to neutralize whatever potential may appear at a fixed point on a voltage divider between conductors 1 and 2. This point is chosen to be substantially at ground potential under normal operating conditions. Voltage divider 18 is replaced in Fig. 3 by the resistors 34 and 35. The capacitive "remembering" circuit is still the capacitor 21 connected between the terminal 36a of the switch 36 and ground. Amplifier 23 is still connected in a cathode-follower circuit. In this case, the source of direct potential furnishing anode voltage is the battery 37.

A variable and reversible source of direct potential, such as a power pack, is used to raise the potential of the cathode-follower circuit to a level corresponding to the potential of switch 36. The variable ratio transformer 40 is connected to a source of alternating voltage and has its output connected to the primary windings of transformer 25. The output of transformer 25 is subjected to full-wave rectification and connected across reversing switch 38.

It is only necessary for the operator to adjust transformer 40 until the cathode of amplifier 23 conducts. When the ammeter 42 reads on scale, amplifier 23 is conducting.

The junction of resistors 34 and 35 may be above or below ground potential, depending upon the relative magnitudes of resistors 3 and 4. Therefore, the voltage of the junction of resistor 28 and battery 37 might be required to be either positive or negative with respect to ground, and its polarity is changed by means of reversing switch 38.

While capacitor 21 is connected to switch 36, the voltage on the control electrode of amplifier 23 is equal to the potential of switch 36 with respect to ground. The cathode-follower adjusts its cathode potential to its grid potential. After capacitor 21 is charged to the potential of switch 36, switch 36 is manipulated to contact terminal 36b. Now the potential of switch 36 as "remembered" by capacitor 21 is transmitted through the cathode-follower circuit and connected in opposition to the actual potential on switch 36 through ammeter 33 and battery 41. The net potential on switch 36 is now equal to the known voltage of battery 41. The reading obtained on ammeter 33 indicates the total resistance of resistors 34 and 35 in parallel, and in series with leakage resistors 3 and 4 in parallel. Since the resistance of resistors 34 and 35 in parallel is constant, ammeter 33 can be calibrated to read directly the resistance of 3 and 4 in parallel. This, of course, is the leakage resistance.

The ground detector arrangement illustrated in Fig. 4 is substantially that shown in Fig. 3 with the addition of motor driven means for automatically performing the manual operations described for Fig. 3. The control motor 43 drives a cam 43a which operates the switches 44 and 45 to simultaneously close the contacts 46 and 47 and open the contacts 48 and 49 for a predetermined time interval, such as 58 seconds out of each minute. Switch 44 simply replaces switch 36 in Fig. 3.

A variable, reversible source of direct potential such as the twin power pack shown in Fig. 4 is connected between the cathode-follower circuit and ground. The primary of each of the transformers 53 and 54 is connected between one side of variable ratio transformer 39 and the slider 39a on transformer 39. Each of the anodes of rectifier 55 is connected to a different terminal of the secondary winding of transformer 53, and each of the anodes of rectifier 56 is connected to a different terminal of the secondary winding of transformer 54. Each of the cathodes of rectifiers 55 and 56 is connected to a different terminal of the capacitor 57. The resistor 58 is connected in parallel relation with capacitor 57. The center points of resistor 58 and the secondary windings of transformers 53 and 54 are connected together. Motors 43 and 52 are energized through the alternating supply conductors 59 and 60.

The high-range relay 50 and the low-range relay 51 replace ammeter 42 and are connected in series in the anode circuit of amplifier 23. Each relay has a holding coil mechanism causing it to drop out at a lower current level than the level at which it picks up. The current level at which relay 51 picks up is somewhat lower than the current level at which relay 50 drops out.

To illustrate the operation of relays 50 and 51 with amplifier 23, assume that 4 milliamps of current flow in the anode circuit when the control electrode and cathode are at the same potential, zero bias. Relay 50 picks up at 10 milliamps and drops out at 6 milliamps. Relay 51 picks up at 4 milliamps and drops out at 1.2 milliamps. When the current is between 4 milliamps and 10 milliamps, only relay 51 picks up. Relay 50 is also picked up when the tube current gets above 10 milliamps. When the current decreases to 6 milliamps, relay 50 drops out, and when the current decreases to 1.2 milliamps, relay 51 drops out.

The motor 52 is a reversible motor operating at a speed such as 4 revolutions per minute. Motor 43 operates at some speed such as 1 revolution per minute and can be energized through contacts 47, or through contacts 49 and the contacts of relays 50 and 51. Relays 50 and 51 operate contacts 50a and 50b, and 51a and 51b, respectively, to control motor 43 and motor 52.

In operation, switches 44 and 45 close the contacts 48 and 49, respectively. Condenser 21 is charged to the potential of the point between resistor 34 and 35. This same potential is also applied to the control electrode of amplifier 23.

Consider, first, the condition in which amplifier 23 is biased substantially positive. When contacts 48 and 49 are closed, the potential with respect to ground of the control electrode of amplifier 23 becomes substantially greater than the cathode potential with respect to ground. A current of greater than 10 milliamps flows in the anode circuit and relays 50 and 51 pick up closing contacts 50b and 51b. Motor 52 is energized through its terminals 52a and 52c and rotates in a clockwise direction changing the position of slider 39a on transformer 39, thereby increasing the potential across capacitor 57 and raising the potential of the cathode of amplifier 23 with respect to ground. As the cathode potential approaches the control electrode potential, the anode current decreases to the 4 to 6 milliamp range. Relay 50 drops out and motor 43 is connected across the alternating supply conductors 58 and 59 through contacts 50a and 51b.

When the cam 43a closes contacts 46 and 47 once more, the potential of the point between resistors 34 and 35 is "remembered" by capacitor 21 and applied to the control electrode. The cathode-follower applies the "remembered" voltage in series with battery 41 and in opposition to the voltage on the junction of resistors 34 and 35 thereby enabling ammeter 33 to indicate the resistance of the circuit.

If the control electrode and the cathode voltages of amplifier 23 are substantially the same when contacts 48 are closed, 4 to 6 milliamps flow in the anode circuit. The cathode-follower circuit adjusts itself to make the cathode and control electrode voltages equal. Only relay 51 is picked up. Motor 43 continues to operate through contacts 50a and 51b.

Consider now the condition in which amplifier 23 is biased substantially negative, a current of less than 1.2 milliamps flows in the anode circuit. Neither relay is picked up. Motor 52 is then energized through contacts 50a, 51a, 52b and 52c and rotates in a counterclockwise direction moving slider 39a to decrease the potential on capacitor 57. This decreases the potential of the cathode with respect to ground until the control electrode and cathode potentials are once more equal. As the cathode potential approaches the control electrode potential, the tube current increases to the 4 to 6 milliamp range. Relay 51 picks up, motor 52 is deenergized, and motor 43 is energized once more. When motor 43 is energized, the circuit continues to operate as hereinbefore described.

While my invention has been described by reference to particular embodiments thereof, it will be understood that this is by way of illustration of the principles involved and that those skilled in the art may make many modifications in the arrangement and mode of operation. Therefore, I contemplate by the appended claims to cover any such modifications as fall within the true spirit and scope of my invention.

What I claim as new and desire to secure by Letters Patent of the United States is:

1. In a direct current power transmission system having a pair of energized direct current supply conductors and having a leakage resistance between one of said conductors and ground, a circuit for detecting the presence of grounds on said energized direct current supply conductors, said ground detector circuit including said leakage resistance and comprising a resistive circuit connected across said supply conductors, a pair of resistances connected between said resistive circuit and ground, a resistance indicating device connected between a variable point on said resistive circuit and the common terminal of said resistances, and means for selectively connecting a unidirectional potential of fixed value across said pair of resistances to facilitate adjusting said variable point to measure the leakage resistance.

2. In a direct current power transmission system having a pair of energized direct current supply conductors having a leakage resistance to ground, a circuit for detecting the presence of grounds on said pair of energized direct current supply conductors, said ground detector circuit including said leakage resistance and comprising a first potentiometer connected across said supply conductors, a source of direct potential, a second potentiometer having the end terminals thereof connected together, a calibrated variable resistor having a first terminal connected to said end terminals, a switching device for interposing said source of direct potential serially between said variable resistor and ground, two ratio resistors serially connected between said first terminal and ground, said first and said second potentiometers having a common adjustable contact and the ratio between the magnitudes of the effective resistances of said first and second potentiometers being substantially equal to the corresponding ratio for said ratio resistors, and a resistance indicating device including said second potentiometer, said calibrated resistor, and an electric meter device responsive to voltages and connected between said common adjustable contact and the common terminal of said ratio resistors for indicating voltage difference therebetween.

3. In a direct current power transmission system having a pair of energized direct current supply conductors having a leakage resistance to ground, a circuit for detecting the presence of grounds on said pair of energized direct current supply conductors, said ground detector circuit comprising said leakage resistance, a resistive voltage divider connected across said supply conductors, said voltage divider having taps at discrete voltage levels thereon, a selector switch having a selector member and having contacts corresponding to said taps, a plurality of resistors, a different one of said resistors connected between each of said contacts and the corresponding tap on said voltage divider, an electron discharge device having an anode, a cathode, and a control electrode, a source of direct potential connected between said anode and ground and having a terminal thereon for obtaining voltage at a predetermined level for measuring said leakage resistance, a resistor connected between said cathode and ground, a voltmeter, a capacitor, a switch having contacts for selectively connecting said capacitor between said selector member and ground and between said terminal and said control electrode, said last-mentioned switch also having contacts for connecting said voltmeter in parallel relationship with said capacitor when said capacitor is connected between said selector arm and ground, a resistance indicating device, and contacts on said last-mentioned switch for connecting said resistance indicating device between said cathode and said selector member when said capacitor is connected between said control electrode and said terminal.

4. In a direct current power transmission system having a pair of energized direct current supply conductors and having a leakage resistance between each conductor and ground, a circuit for detecting the presence of grounds on said pair of energized direct current supply conductors comprising a resistive voltage divider connected across said supply conductors and having a tap at a determinable point thereon, an electron discharge device having an anode, a cathode, and a control electrode, a resistor connected to said cathode, a capacitor connected between said control electrode and ground, a switch having contacts for connecting said voltage divider tap between said capacitor and said control electrode, a resistance indicating device, a source of direct potential serially connected with said resistance indicating device, said switch also having contacts for connecting said voltage divider tap to said cathode through said resistance indicating device and said source of direct potential, a reversing switch, and a variable source of direct potential connected through said reversing switch between ground and said cathode resistor.

5. In a direct current power transmission system having a pair of energized direct current supply conductors and having a leakage resistance between each conductor and ground, a circuit for detecting the presence of grounds on said pair of energized direct current supply conductors and comprising a resistive circuit connected across said supply conductors, an electron discharge device having an anode, a cathode, and a control electrode, a series circuit connecting said anode to said cathode, a high-range relay serially connected in said anode circuit responsive to a first predetermined value of current to pick up and responsive to a second predetermined value of current to drop out, a low-range relay serially connected in said anode circuit responsive to a third predetermined value of current to pick up and responsive to a fourth predetermined value of current to drop out, each of said predetermined values of current being of smaller magnitude than the preceding predetermined value of current, a cathode resistor serially connected in said anode circuit and having one end connected to said cathode, a capacitor connected between the other end of said cathode resistor and ground, a circuit including a capacitor connecting said control electrode to ground, a variable and reversible source of direct potential, a reversible electric motor, a pair of alternating current supply conductors, a circuit for energizing said reversible motor, contacts in series in said reversible motor circuit and operated by said relays for controlling said reversible motor, means driven by said reversible motor varying and reversing said variable and reversible source of direct potential, a control motor, a first circuit for energizing said control motor, contacts in series in said first control motor circuit and operated by said relays for controlling the operation of said control motor, a second control motor circuit for connecting said control motor across said alternating supply conductors, cams mounted for rotation by said control motor, switching devices operated by said cams and having contacts for simultaneously connecting a predetermined point in said resistive circuit to said control electrode circuit between said control electrode and said capacitor and connecting said control motor in said first control motor circuit, a resistance indicating device, a second source of direct potential, said switching devices also having contacts for simultaneously connecting said control motor in said second control motor circuit and connecting said predetermined point of said resistive circuit to said cathode through a series circuit consisting of said second source of direct potential and said resistance indicating device.

THEODORE A. RICH.

REFERENCES CITED

The following references are of record in the file of this patent:

UNITED STATES PATENTS

| Number | Name | Date |
| --- | --- | --- |
| 2,022,758 | Corderman | Dec. 3, 1935 |